Patented May 27, 1924.

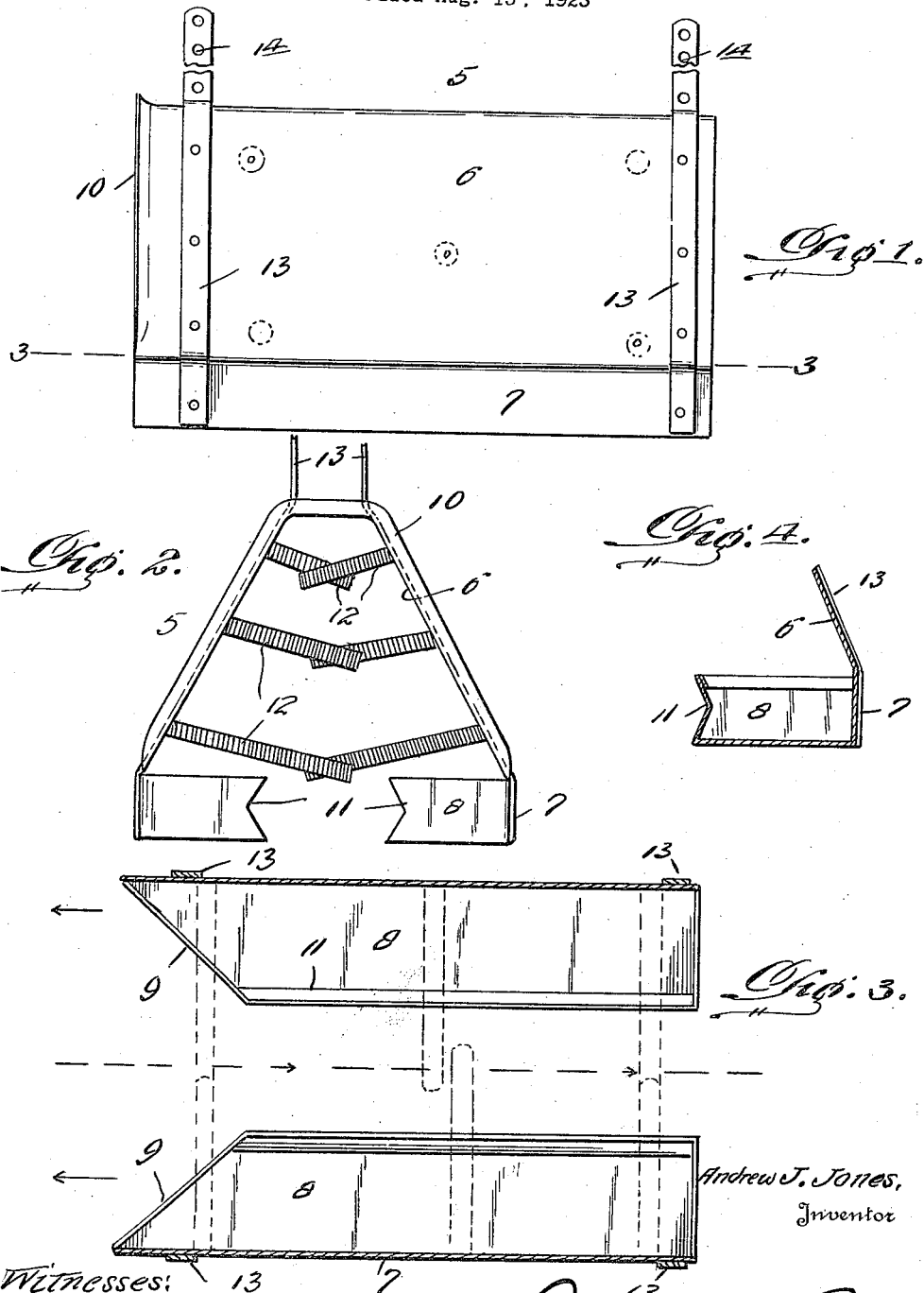

1,495,520

UNITED STATES PATENT OFFICE.

ANDREW J. JONES, OF GARNER, TEXAS.

BOLL-WEEVIL EXTERMINATOR.

Application filed August 15, 1923. Serial No. 657,538.

*To all whom it may concern:*

Be it known that I, ANDREW J. JONES, a citizen of the United States, residing at Garner, in the county of Parker and State of Texas, have invented certain new and useful Improvements in Boll-Weevil Exterminators, of which the following is a specification.

This invention relates to certain new and useful improvements in boll weevil exterminators, and has particular reference to devices of that kind adapted to be moved past the standing plants for knocking the boll weevils from the plants, and including receptacles to hold an exterminating fluid and arranged in position to receive the boll weevil insects as they are knocked from the plants.

The primary object of the invention is to provide a device of the above kind which embraces the desired qualities of simplicity of construction, durability and efficiency in operation.

Another object of the invention is to provide simple and efficient means for knocking the boll weevils off of the plants and an improved manner and arrangement of mounting the same as well as the receptacles for the exterminating fluid.

With the above general object in view, and others that will become apparent as the nature of the invention is better understood, the same consists in the novel form, combination and arrangement of parts hereinafter more fully described, shown in the accompanying drawings and claimed.

In the drawings, wherein like reference characters indicate corresponding parts throughout the several views, Figure 1 is a side elevational view, partly broken away, of a boll weevil exterminator constructed in accordance with the present invention, Figure 2 is an end elevational view thereof, Figure 3 is a horizontal longitudinal sectional view taken substantially upon line 3—3 of Figure 1, and Figure 4 is a fragmentary transverse sectional view taken through one of the receptacles for containing the exterminating fluid.

Referring more in detail to the drawing, the invention embodies a body member 5 in the general form of an inverted channel, open at its ends, and preferably having its side walls downwardly diverging as shown in Figure 2 at 6. The lower longitudinal end portions of the walls 6 are preferably vertical as at 7 and form the outer longitudinal walls of inwardly extending pans 8 which are provided on the lower part of the body 5 and which are disposed in spaced relation as clearly seen from Figures 2 and 3.

To avoid destruction of the plant and to guide the same into the space between the pans 8, the forward ends of the latter are outwardly diverged on an oblique line as at 9, and the forward end of the body 5 is out turned or flared as at 10, while the inner longitudinal side walls of the pans are depressed outwardly as indicated at 11. The lower portion of the depression in the side wall serves to prevent spilling of the liquid from the pan during the operation of the exterminator by directing the liquid outwardly from the wall into the central portion of the pan, while the upper portion of the side wall 11 serves to catch and direct weevils into the pan. A plurality of normally straight inwardly projecting yieldable members 12 are provided on the side walls 6, in position to knock the boll weevils from the plant as the device is drawn along opposite sides of the latter, and these members are preferably in the nature of helical springs formed with their convolutions closely wound, as shown. The members 12 preferably incline inwardly and extend slightly beyond each other as shown in Figure 2 with inner ends free so that they may yield for passing the plants.

The pans 8 are preferably disposed in a horizontal position and are open at their tops so that the boll weevils may readily fall into the same when dislodged from the plant by means of the members 12, and the body 5 is preferably constructed of a suitable material which will allow the pans to yield apart if necessary when the plants pass between the pans.

Suitable reinforcing straps 13 are riveted or otherwise secured to the side walls 6, and the upper ends thereof, extend beyond the top of the body member 5 where they are arranged in spaced relation and provided with openings as at 14 for being conveniently attached to the longitudinal beam or other member of a plow, cultivator or the like.

In use, the device is attached so as to depend from a support with the pans 8 positioned directly below the plane of the foliage of the plant, and said pans are filled with some suitable exterminating fluid such as kerosene. The device is then drawn along the rows of plants so that the latter will pass between the pans and the members 12 will strike the foliage for knocking the boll weevils off of the same into the pans 8. It is apparent that when the members 12 are flexed rearwardly during the forward movement of the device, they will rebound with considerable force to assume their normally straight condition and thus the operation of dislodging the boll weevil is effective.

From the foregoing description, it is believed that the construction and operation as well as the advantages of the present invention will be readily understood and appreciated by those skilled in the art.

Minor changes may be made without departing from the spirit and scope of the invention as claimed.

What I claim as new is:—

In a boll weevil exterminator, an elongated pan pointed at its forward end and having a vertical outer longitudinally disposed wall, the pan having an inner longitudinal wall extending from the pointed end of the pan to the rear end thereof, the said inner wall being depressed inwardly over the bottom of the pan, said depression extending the full length of the inner wall and the angle of the depression being disposed along the median longitudinal dimension of the inner wall.

In testimony whereof I affix my signature.

ANDREW J. JONES.